WITNESSES
John E. Healy, Jr.
Leon M. Garman

INVENTORS
Martin L. Jones &
Jimmy M. Horner
BY M. J. Brodahl
ATTORNEY

July 30, 1963 M. L. JONES ETAL 3,099,754

MAGNETIC MODULATOR WITH TIME JITTER COMPENSATION FOR GENERATED PULSES

Filed May 31, 1961 3 Sheets-Sheet 3

United States Patent Office 3,099,754

Patented July 30, 1963

3,099,754

MAGNETIC MODULATOR WITH TIME JITTER COMPENSATION FOR GENERATED PULSES

Martin L. Jones and Jimmy M. Horner, both of Baltimore, Md., assignors to Westinghouse Electric Corporation, East Pittsburgh, Pa., a corporation of Pennsylvania Filed May 31, 1961, Ser. No. 113,711
8 Claims. (Cl. 307—88.5)

The present invention relates to modulators for providing a pulse output, and more particularly to magnetic modulators with time jitter compensation for providing a pulse output with a constant pulse repetition rate.

Magnetic modulators known in the prior art are attractive from the standpoint of size and reliability. These modulators however have the limitation of excessive time jitter, i.e. variation of the time of occurrence of pulses from a desired repetition rate. Essentially all of the time jitter is produced by frequency and voltage variations in the power supply. The problem of frequency variation can be readily solved by using direct current resonant charging techniques.

Since the output pulse of a magnetic modulator is produced by saturating magnetic core elements over a constant volt-time integral, any variation in the voltage over this time integral will produce a corresponding inverse variation in the time. To avoid this variation, the power supply must be exceptionally well regulated and filtered. To produce a magnetic modulator with sufficiently low time jitter to be of the same quality as other known type modulators, the undesirable effects of power supply ripple and voltage variations must be essentially eliminated.

It is therefore an object of the present invention to provide a new and improved modulator with time jitter compensation.

It is a further object of the present invention to provide a new and improved magnetic modulator with time jitter compensation to compensate for variations in the power supply voltage so that the output pulses are of a constant repetition rate.

Briefly, the present invention accomplishes the above cited objects by providing a semiconductor switch, which has the characteristic that its switching time is inversely proportional to the amplitude of a trigger pulse applied thereto, to energize one or more magnetic modulator saturable reactors and then controlling the amplitude of the trigger pulse applied to the semiconductor switch such that it varies inversely with the magnitudes of the power supply ripple and average voltages. In accordance with the present invention, energy is stored in a storage circuit at a level corresponding to the instantaneous value of the power supply voltage; the amplitude of the trigger pulse is controlled by the energy level stored in the storage circuit, and the semiconductor device is triggered conductive by each trigger pulse to discharge the energy stored in the storage circuit through circuitry including one or more saturable reactors. At the same time, the amplitude of the trigger pulse is controlled by diode clamping in accordance with the average value of the power supply voltage. Thus, by controlling the time at which the device becomes conductive to supply energy to the saturable reactors, the saturable reactors are controlled to reach saturation at a predetermined time after receipt of a trigger pulse regardless of the ripple and average voltage of the power supply.

These and other objects will become more apparent when read in view of the following specification and drawings, in which.

Figure 1:
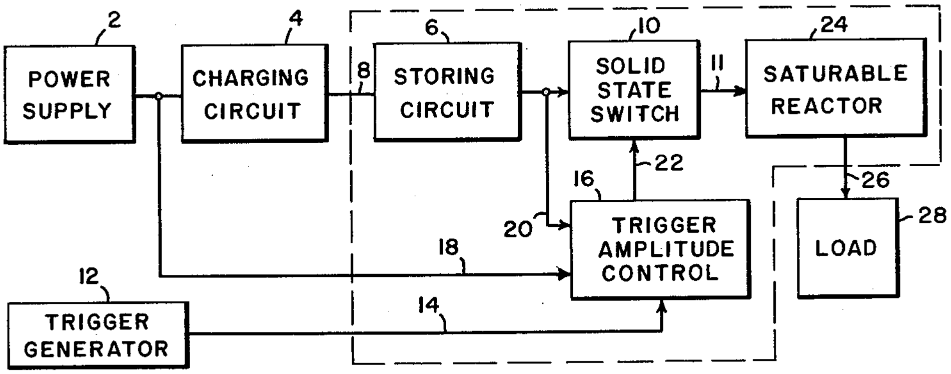
FIGURE 1 is a block diagram of a magnetic modulator constructed in accordance with the features of the present invention.

Referring to FIGURE 1, the direct current power supply 2 supplies a voltage having frequency and voltage variations to the charging circuit 4, which for example may be a D.C. resonant charging circuit. The charging circuit 4 removes frequency variations from the supplied voltage in the well known manner and supplies the resulting voltage to the storing circuit 6 over lead 8. The solid state switch 10, which may for example be a silicon controlled rectifier, a dynistor or other suitable semiconductor device. which has the characteristic of being able to be triggered from its nonconducting to its conducting state and whose switching time between the states is inversely proportional to the amplitude of a triggering pulse applied thereto. The trigger generator 12 provides trigger pulses through lead 14 to the trigger amplitude control circuit 16. The output of the power supply 2 is also applied to the trigger amplitude control circuit 16 through lead 18 as is the output of the storing circuit 6 through lead 20. The trigger amplitude control circuit 16 supplies a modified or corrected trigger pulse through lead 22 to the trigger electrode of the solid state switch 10. The amplitude of the trigger pulse applied to the solid state swich 10 is dependent upon the level to which the storing circuit 6 is charged. That is, if the storing circuit 6 is charged to a greater than desired value, the amplitude of the trigger pulse applied to the solid state switch 10 will be decreased, thus requiring a longer switching time for the solid state switch 10; and if the charge level on the storing circuit 6 is lower than the desired value, the amplitude of the trigger pulse applied to the solid state switch 10 will be increased, thus decreasing the switching time for the switch 10. The solid state switch 10 when activated discharges the storing circuit 6 to provide an input to the saturable reactor 24. In order for the saturable reactor 24 to provide a pulse output to the load 28 through lead 26, a predetermined amount of energy, determined by the saturating volt-time integral, must be applied to the saturable reactor. If the voltage applied to the reactor is decreased, it thus takes a longer time in order to apply the same amount of energy to the reactor and the pulse output is delayed. Conversely, if the voltage is increased, a pulse output will be produced at a time sooner than desired.

Figure 2A:
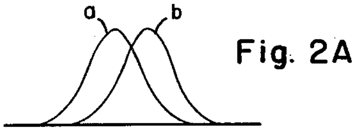
FIGS. 2A and 2B are waveform diagrams showing the effect of time jitter.
Figure 2B:
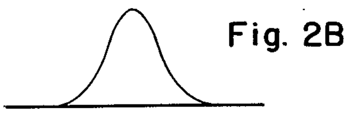

The waveform of FIGURE 2A shows the problem of time jitter. If constant amplitude trigger pulses were applied to the solid state switch 10 the switching time of the switch would necessarily remain constant. Therefore, if the storing circuit were charged to a higher than desired voltage, the saturable reactor 24 would receive a higher than usual voltage when the switch 10 became conductive. The saturable reactor 24 would then provide the pulse *a* of FIGURE 2A at a time sooner than desired. If the storing circuit 6 has a voltage charge less than the desired value, the saturable reactor would not provide a pulse output until the time as shown in curve *b* of FIGURE 2A. A measure of the time jitter would then be the time difference between the peaks of curves *a* and *b*. The curve of FIGURE 2B shows the desired curve of pulse output as applied to the load 28 when time jitter compensation is provided through the features of the present invention.

Figure 3:
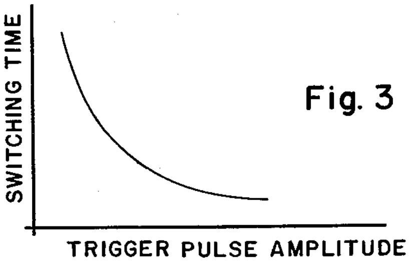
FIG. 3 is a plot of switching time versus trigger pulse amplitude for a typical semiconductor switching device.

FIGURE 3 shows a plot of a typical pulse switching device such as a silicon controlled rectifier or a dynistor. As shown the switching time of the device from nonconduction to full conduction is inversely proportional to the amplitude of the triggering pulse applied to its trigger electrode.

Figure 4:
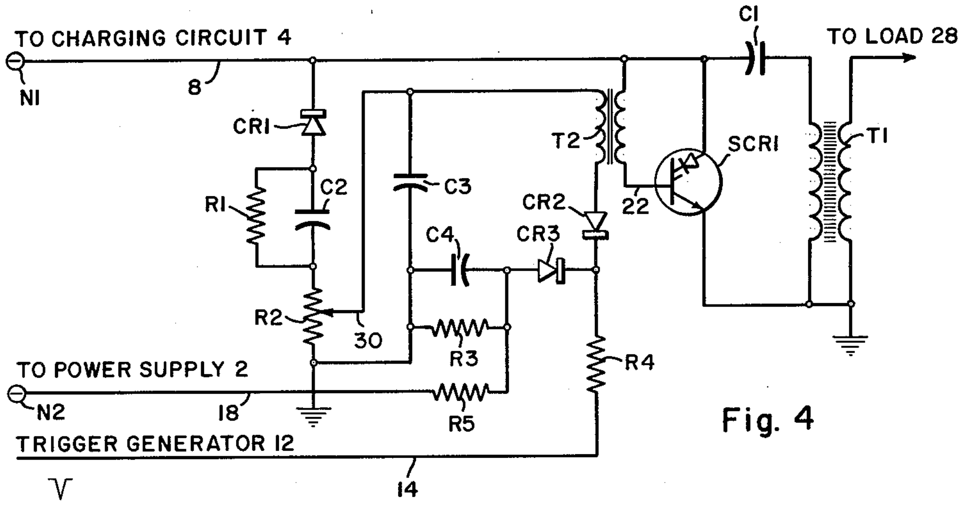
FIG. 4 is a schematic diagram of the trigger amplitude control circuitry as embodied in the present invention.

In FIGURE 4 is shown the schematic diagram of the apparatus shown within the dotted lines of FIGURE 1. Reference should also be made to the waveforms of FIGURES 5A, 5B and 5C. The storage circuit capacitor C1 is charged from a negative terminal N1 through the charging circuit 4 connected to lead 8. The diode CR1 prevents substantial leakage of charge from the capacitor C2. The voltage across the resistor R2 is proportional to the voltage level of the capacitor C1. The capacitor C2 in the circuit of the capacitor C1 has the bleeder resistor R1 shunting it, which maintains the voltage across the capacitor C2 at a substantially constant value. The resistor R2 has a tap 30 connected through a blocking capacitor C3 to ground and also to the transformer T2 and in turn to the anode of the diode CR2. The voltage taken from the tap on the resistor R2 then back biases the diode CR2 in proportion to the voltage on the capacitor C1, so as the voltage on the capacitor C1 increases the back bias on the diode CR2 also increases. The voltage from the power supply 2 is applied from a negative terminal N2 across the resistors R5 and R3, serving as a voltage divider to back bias the diode CR3. A blocking capacitor C4 is connected from the anode of the diode CR3 to ground. When a trigger pulse from the trigger generator 12 is applied (of negative polarity, as shown in FIG. 4) over lead 14, it passes through resistor R4 and is amplitude clamped to a predetermined value determined by the average power supply of voltage as the bias on the diode CR3 is proportional to this voltage; thus the amplitude of trigger pulse supplied to the cathode of the diode CR2 is of a constant value. The amplitude of the trigger pulse which passes through the diode CR2 is determined by the amount of bias provided by the voltage across the tap on the resistor R2. So if a higher voltage than desired is across the capacitor C1, a smaller trigger pulse will be supplied to the transformer T2, as the back bias applied to the diode CR2 is increased in proportion to the voltage across the capacitor C1. The trigger pulse induced in the secondary winding of the transformer T2 is applied as a triggering pulse to the triggering electrode of the silicon controlled rectifier or dynistor SCR1 through lead 22. When the switch SCR1 is rendered conductive, the capacitor C1 is discharged therethrough and so applied to the saturable reactor T1. After a predetermined amount of energy is supplied to the core of the saturable reactor T1 an output pulse is applied to the load circuit 28.

Figure 5A:
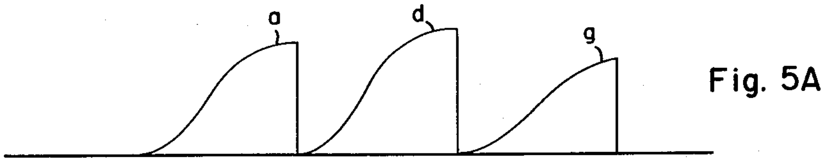
FIGS. 5A, 5B and 5C are waveform diagrams to aid in the explanation of the operation of the present invention.
Figure 5B:
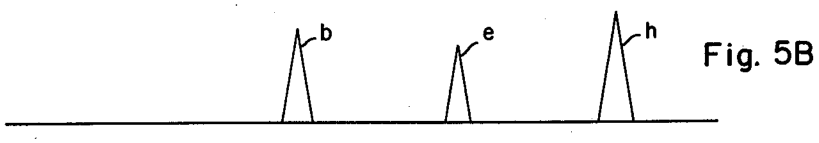
Figure 5C:
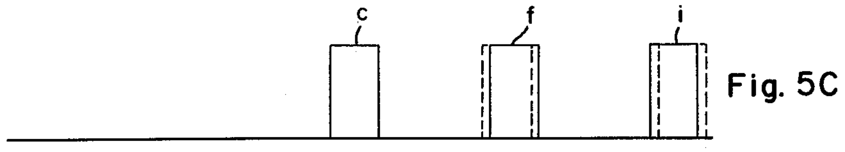

Referring to FIGURE 5A, curve *a* shows the average desired voltage level to which the capacitor C1 is charged in order to provide a desired pulse repetition rate. Trigger pulse *b* of FIGURE 5B shows the amplitude of the trigger pulse supplied to the semiconductor switch SCR1 with the average value of voltage on the capacitor C1. FIGURE 5C shows the desired output pulse *c* occurring after a predetermined time interval after the application of the switching pulse *b* to the semiconductor switch SCR1. Curve *d* of FIGURE 5A shows the capacitor C1 charged to a larger than desired voltage due to fluctuations in the power supply 2. The forward bias on the diode CR2 is then increased so that the amplitude of the trigger pulse, curve *e* of FIG. 5B, therethrough is decreased so the switching time of the semiconductor switch SCR1 is increased in order to have the output pulse *f* appear at a constant repetition rate. If the amplitude of the trigger pulse *e* had been of the same amplitude of the trigger pulse *b*, the output pulse would have occurred at the time shown by the dotted lines of FIGURE 5C, since the switching time of the semiconductor switch SCR1 would have been the same and so the saturable reactor T1 would have received the required number of volt-seconds because of the increased voltage supplied thereto at a time sooner than the desired recurrence time, but as the amplitude of the trigger pulse *c* was decreased, the switching time was longer and the output pulse *f* occurred at the desired time. Pulse *g* of FIGURE 5A shows, a smaller than desired amplitude on the capacitor C1 due to a fluctuation in the output of the power source 2. As the voltage across the capacitor C1 is decreased, the voltage across the resistor R2 is also decreased; thus a smaller bias is provided to the diode CR2 so permitting a larger amplitude trigger pulse, curve *h* of FIG. 5B, to pass therethrough and so to the trigger electrode of the semiconductor switch SCR1. If a trigger pulse of the average amplitude as trigger pulse *b* of FIGURE 5B would have been applied to the switch SCR1, the output pulse would have been delayed in time as the saturable reactor T1 would not have received the necessary amount of energy within the desired time to provide an output pulse, and a delayed pulse shown by the dotted lines in FIG. 5C would have been supplied to the load. However, as the amplitude of the trigger pulse 8 was increased the switching time of the semiconductor switch SCR1 was decreased thus allowing the output saturable reactor to receive the necessary volt-seconds within the desired time to allow the output pulse *i* to occur at the desired repetition time.

Figure 6:
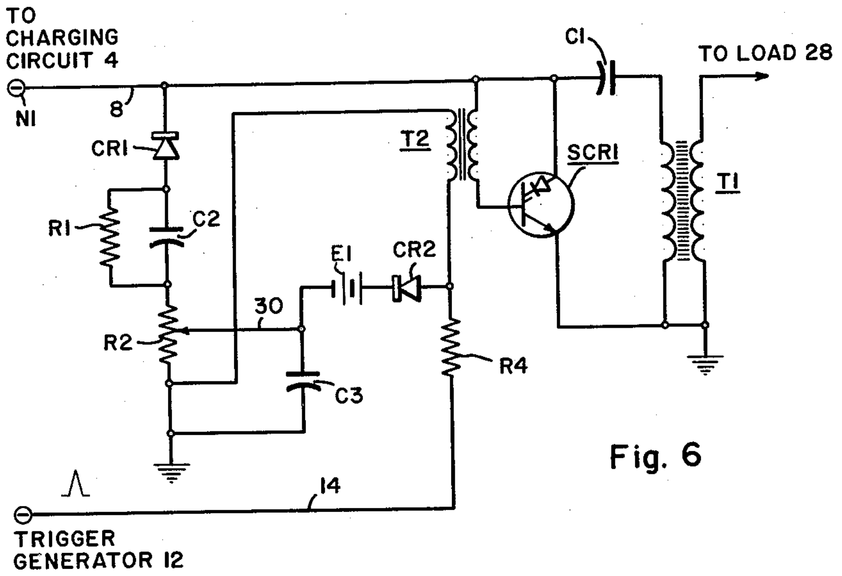
FIG. 6 is a schematic diagram of other trigger amplitude control circuitry as embodied in the present invention.

FIGURE 6 shows another embodiment of the circuitry for providing trigger amplitude control as enclosed within the dotted blocks of FIGURE 1. The circuit of FIGURE 6 is substantially the same as that of FIGURE 4, however, the voltage divider network of R3 and R5 used to bias the diode CR3 has been replaced with the battery E1 to back bias the diode CR2 of FIGURE 6. A positive trigger pulse is applied through resistor R4 and is amplitude controlled in response to the voltage across the tap of the resistor R2 and the bias voltage of the battery E1. The circuit then operates substantially the same as the circuit of FIGURE 4.

Figure 7:
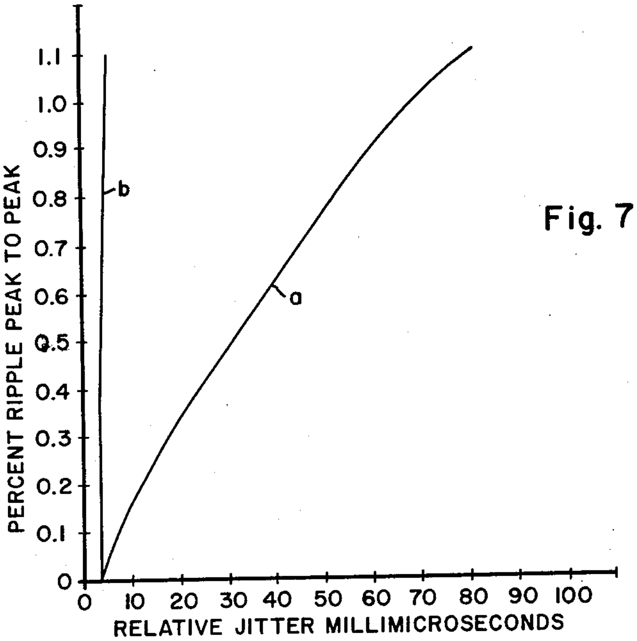
FIG. 7 is a plot of ripple peak-to-peak of the power supply versus relative time jitter fore cases with and without jitter compensation.

FIGURE 7 shows a plot of the percent ripple peak-to-peak of the power supply 2 as a function of the relative time jitter in microseconds. Curve *a* shows the relative time jitter without jitter compensation and shows that as the percent peak-to-peak ripple increases the amount of time jitter also increases approximately linearly. Curve *b* shows the relative time jitter with jitter compensation as provided by tested models of the circuitry of FIGURES 4 or 6, and shows that with the jitter compensation the amount of jitter between output pulses is substantially constant at a low value.

Although the present invention has been described with a certain degree of particularity, it should be understood that the present disclosure has been made only by way of example and that numerous changes in the details of the circuitry and the combination of arrangement of elements may be resorted to without departing from the scope and spirit of the present invention.

We claim as our invention:

1. In a modulator driven by an energy source and operative to provide output pulses of a constant repetition rate, the combination of: storage means responsive to be charged to an energy level dependent upon the output of said energy source; semiconductor switching means responsive upon receiving a trigger pulse to discharge said storage means, said switching means having the characteristic that its switching time is inversely proportional to the amplitude of said trigger pulse; amplitude control means operative to vary the amplitude of said trigger pulse applied to said switching means in response to variations in the output of said energy source; and utilization means operative to provide a discharge path for said storage means.

2. In a modulator driven by an energy source and operative to provide pulses of a constant repetition rate to a load circuit the combination of: storage means responsive to be charged to an energy level dependent upon the output of said energy source; semiconductor switching means responsive upon receiving a trigger pulse to discharge said storage means, said switching means having the characteristic that its switching time is inversely proportional to the amplitude of said trigger pulse; amplitude control means operative to vary the amplitude of said trigger pulse applied to said switching means in response to variations in said energy source; and saturable reactor means operative to provide a discharge path for said storage means and being responsive to a predetermined amount of energy from said storage means to supply a pulse output having a constant pulse repetition rate to said load circuit.

3. In a modulator driven by an energy source and operative to provide pulses of a constant repetition rate to a load circuit the combination of: storage means responsive to be charged to an energy level dependent upon the output of said energy source; semiconductor switching means responsive upon receiving a trigger pulse to discharge said storage means, said switching means having the characteristic that its switching time is inversely proportional to the amplitude of said trigger pulse; amplitude control means operative to vary the amplitude of said trigger pulse applied to said switching means in response to variations in said energy source, said amplitude control means including a unidirectional device which is biased in proportion to the energy level of said storage means and being operative to control the amplitude of said trigger pulses passing therethrough to said switching means; and utilization means operative to provide a discharge path for said storage means.

4. In a modulator driven by an energy source and operative to provide pulses of a constant repetition rate to a load circuit the combination of: storage means responsive to be charged to an energy level dependent upon the output of said energy source; semiconductor switching means responsive upon receiving a trigger pulse to discharge said storage means, said switching means having the characteristic that its switching time is inversely proportional to the amplitude of said trigger pulse; amplitude control means operative to vary the amplitude of said trigger pulse applied to said switching means in response to variations in said energy source; said amplitude control means including a unidirectional device which is biased in proportion to the energy level of said storage means and being operative to control the amplitude of said trigger pulses passing therethrough to said switching means; and saturable reactor means operative to provide a discharge path for said storage means and being responsive to a predetermined amount of energy from said storage means to supply a pulse output having a constant pulse repetition rate to said load circuit.

5. In a modulator driven by an energy source and operative to provide pulses of a constant repetition rate to a load circuit the combination of: storage means responsive to be charged to an energy level dependent upon the output of said energy source; semiconductor switching means responsive upon receiving a trigger pulse to discharge said storage means, said switching means having the characteristic that its switching time is inversely proportional to the amplitude of said trigger pulse; amplitude control means operative to vary the amplitude of said trigger pulse applied to said switching means in response to variations in said energy source, said amplitude control means including a first unidirectional device which is biased in proportion to the energy level of said storage means and being operative to control the amplitude of said trigger pulses passing therethrough to said switching means and a second unidirectional device operative to amplitude control the amplitude of said trigger pulse in proportion to the average supply voltage of said energy source; and utilization means operative to provide a discharge path for said storage means and being responsive to a predetermined amount of energy from said storage means to supply a pulse output having a constant pulse repetition rate to said load circuit.

6. A magnetic modulator with compensation for time jitter variations of output pulses deviating from a constant pulse repetition rate including, an energy source, storage means responsive to be charged to an energy level dependent upon the output of said energy source, semiconductor switching means including a triggering electrode which when pulsed renders said switching means conductive, a trigger pulse source operative to selectively provide trigger pulses to said electrode, said switching means having the characteristic that its switching time from nonconduction to conduction is inversely proportional to the amplitude of said trigger pulses, amplitude control means operative to vary the amplitude of said trigger pulses inversely in response to the energy level of said storage means, saturable reactor means operative to provide a discharge path for said storage means and being responsive to predetermined amount of energy from said storage means to supply a pulse output having a constant pulse repetition rate, and a load circuit operative to utilize said pulse output.

7. A magnetic modulator with compensation for time jitter variations of output pulses deviating from a constant pulse repetition rate including, an energy source, storage means responsive to be charged to an energy level dependent upon the output of said source, semiconductor switching means including a triggering electrode which when pulsed renders said switching means conductive, a trigger pulse source operative to selectively provide trigger pulses to said electrode, said switching means having the characteristic that its switching time from nonconduction to conduction is inversely proportional to the amplitude of said trigger pulses, amplitude control means operative to vary the amplitude of said trigger pulse inversely in response to the energy level of said storage means, said amplitude control means including a unidirectional device which is biased in proportion to the energy level of said storage means and being operative to control the amplitude of said trigger pulses passing therethrough to said trigger electrode, saturable reactor means operative to provide a discharge path for said storage means, and responsive to predetermined amount of energy from said storage means to supply a pulse output having a constant pulse repetition rate, and a load circuit operative to utilize said pulse output.

8. A magnetic modulator with compensation for time jitter variations of output pulses deviating from a constant pulse repetition rate including, an energy source, storage means responsive to be charged to an energy level dependent upon the output of said energy source, semiconductor switching means including a triggering electrode which when pulsed renders said switching means conductive, a trigger pulse source operative to selectively provide trigger pulses to said electrode, said switching means having the characteristic that its switching time from nonconduction to conduction is inversely proportional to the amplitude of said trigger pulses, amplitude control means operative to vary the amplitude of said trigger pulses inversely in response to the energy level of said storage means, said amplitude control means including a first unidirectional device which is biased in proportion to the energy level of said storage means and being operative to control the amplitude of said trigger pulses passing therethrough to said trigger electrode and a second unidirectional device operative to amplitude control said trigger pulse in proportion to the average supply potential of said energy source, saturable reactor means operative to provide a discharge path for said storage means and responsive to a predetermined amount of energy from said storage means to supply a pulse output having a constant pulse repetition rate, and a load circuit operatively connected to utilize said pulse output.

References Cited in the file of this patent

UNITED STATES PATENTS

| | | |
|---|---|---|
| 2,497,411 | Krumhansl | Feb. 14, 1950 |
| 2,849,537 | Eglin | Aug. 26, 1958 |
| 3,004,155 | Brite | Oct. 10, 1961 |

FOREIGN PATENTS

| | | |
|---|---|---|
| 1,235,969 | France | June 7, 1960 |